United States Patent
Riess et al.

(10) Patent No.: US 9,198,451 B2
(45) Date of Patent: Dec. 1, 2015

(54) AROMA COMPOSITION TO REDUCE OR SUPPRESS UNDESIRABLE BITTER AND ASTRINGENT TASTE IMPRESSIONS OF SWEETENERS

(75) Inventors: Thomas Riess, Holzminden (DE); Jakob Peter Ley, Holzminden (DE); Maria Blings, Holzminden (DE); Christopher Sabater-Lüntzel, Holzminden (DE); Katharina Reichelt, Rosenheim (DE); Deborah Kennison, Wayne, NJ (US); Martin Gurney, East Hanover, NJ (US); Katja Obst, Kitzen (DE)

(73) Assignee: SYMRISE AG, Holzminden (DE)

( * ) Notice: Subject to any disclaimer, the term of this patent is extended or adjusted under 35 U.S.C. 154(b) by 481 days.

(21) Appl. No.: 12/634,756

(22) Filed: Dec. 10, 2009

(65) Prior Publication Data

US 2010/0151055 A1    Jun. 17, 2010

Related U.S. Application Data

(60) Provisional application No. 61/121,714, filed on Dec. 11, 2008.

(51) Int. Cl.
| | | |
|---|---|---|
| A61K 33/14 | (2006.01) | |
| A23L 1/221 | (2006.01) | |
| A23L 1/236 | (2006.01) | |
| A23L 1/22 | (2006.01) | |

(52) U.S. Cl.
CPC ............ *A23L 1/2366* (2013.01); *A23L 1/22083* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 3,924,017 A | 12/1975 | Lee et al. | |
| 2002/0188019 A1 * | 12/2002 | Ley et al. | 514/456 |
| 2004/0014084 A1 | 1/2004 | Krukonis et al. | |
| 2004/0142084 A1 | 7/2004 | Knueven | |
| 2006/0087991 A1 | 4/2006 | Christie | |

FOREIGN PATENT DOCUMENTS

| | | | |
|---|---|---|---|
| EP | 1177728 A1 * | 2/2002 | |
| EP | 1258200 A2 | 11/2002 | |
| EP | 1955601 A1 | 8/2008 | |
| EP | 1972203 A1 | 9/2008 | |
| EP | 1989944 A1 | 11/2008 | |
| EP | 2008530 A1 | 12/2008 | |
| WO | WO-9820753 A1 | 5/1998 | |
| WO | WO-2004078302 A1 | 9/2004 | |
| WO | WO-2005096841 A1 | 10/2005 | |
| WO | WO-2006024587 A1 | 3/2006 | |
| WO | WO-2006058893 A2 | 6/2006 | |
| WO | WO-2006087991 A1 | 8/2006 | |
| WO | WO-2006106023 A1 | 10/2006 | |
| WO | WO 2007003527 A1 * | 1/2007 | |
| WO | WO-2007003527 A1 | 1/2007 | |
| WO | WO-2007014879 A1 | 2/2007 | |
| WO | WO 2007014879 A1 * | 2/2007 | |
| WO | WO-2007045566 A1 | 4/2007 | |
| WO | WO-2007107596 A1 | 9/2007 | |
| WO | WO 2007107596 A1 * | 9/2007 | |
| WO | WO 2007148742 A1 * | 12/2007 | |
| WO | WO-2008046895 A1 | 4/2008 | |

OTHER PUBLICATIONS

Sweetener Table from: von Rymon Lipinski, Gert-Wolfhard, "Sweeteners" in Ullmann's Encyclopedia of Industrial Chemistry, John Wiley and Sons, Ltd, 2000, Section 2.2. URL—http://dx.doi.org/10.1002/14356007.a26_023.*
Ullmann's Encyclopedia of Industrial Chemistry, Section 2.2: Sweetness Intensity.*
Jiang, P., Cui, M., Zhao, B., Liu, Z., Snyder, L.A., Benard, L.M.J., Osman, R., Margolskee, R.F., Max, M. Lactisole Interacts with the Transmembrane Domains of Human T1R3 to Inhibit Sweet Taste. The Journal of Biological Chemistry vol. 280, No. 15, Issue of Apr. 15, pp. 15238-15246, 2005.*
Extended European Search Report, EP Application No. 09178420.7, dated Mar. 23, 2010.

* cited by examiner

*Primary Examiner* — Frederick Krass
*Assistant Examiner* — Michael P Cohen
(74) *Attorney, Agent, or Firm* — Novak Druce Connolly Bove + Quigg LLP

(57) ABSTRACT

The invention concerns an aroma composition to reduce or suppress a bitter or astringent impression in the oral cavity, comprising (i) one or more sweeteners and (ii) one or more specific bitter-masking aroma substances and/or flavourings and optionally (iii) one or more sweetness intensifying aroma substances and/or sweeteners and optionally (iv) one or more inactive substances or carriers. The invention also concerns a preparation, containing such an aroma composition, the use of an aroma composition for reducing or eliminating a bitter and astringent effect of an artificial sweetener and a corresponding method for reducing or eliminating the bitter and astringent effect of a sweetener.

11 Claims, 1 Drawing Sheet

Figure 1:
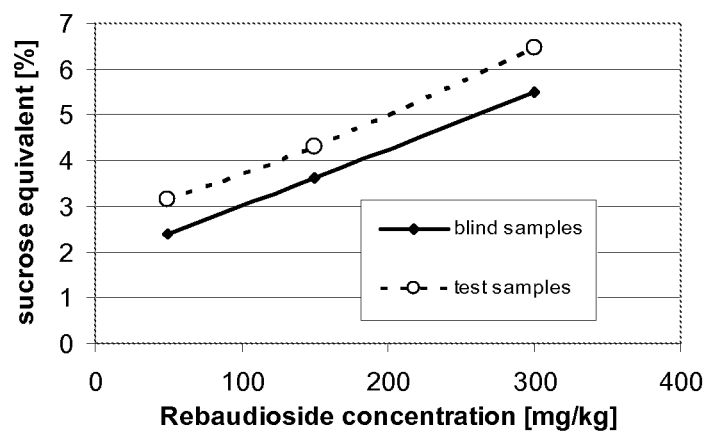

AROMA COMPOSITION TO REDUCE OR SUPPRESS UNDESIRABLE BITTER AND ASTRINGENT TASTE IMPRESSIONS OF SWEETENERS

CROSS REFERENCE TO RELATED APPLICATION

This application claims benefit of priority to U.S. Provisional Application No. 61/121,714, filed on Dec. 11, 2008, which is incorporated herein by reference in its entirety.

The invention concerns an aroma composition to reduce or suppress a bitter or astringent impression in the oral cavity, comprising (i) one or more sweeteners and (ii) one or more specific bitter-masking aroma substances and/or flavourings and optionally (iii) one or more sweetness intensifying aroma substances and/or sweeteners and optionally (iv) one or more inactive substances or carriers. The invention also concerns a preparation, containing such an aroma composition, the use of an aroma composition for reducing or eliminating a bitter and astringent effect of an artificial sweetener and a corresponding method for reducing or eliminating the bitter and astringent effect of a sweetener.

Foodstuffs or products consumed for pleasure with a high sugar content (above all sucrose (=saccharose), lactose, glucose or fructose or mixtures of these), are generally afforded much greater preference by consumers on account of their sweetness. On the other hand, it is commonly known that a high content of easily metabolised carbohydrates can greatly increase the blood sugar level, lead to the formation of fatty deposits and ultimately result in health problems such as being overweight, obesity, insulin resistance, adult-onset diabetes and the secondary diseases to these. This situation is made worse in particular by the fact that many of the abovementioned carbohydrates can also have an adverse effect on dental health, since they are broken down in the oral cavity by certain kinds of bacteria to form lactic acid, for example, which can attack the tooth enamel of baby and adult teeth (caries).

Therefore it has long been an aim to reduce the sugar content of foodstuffs and products consumed for pleasure to the absolute minimum necessary. Such a measure is the use of sweeteners: these are chemically uniform substances which in themselves have little or no calorific value and yet at the same time provide a strong sweet taste impression; these substances are generally non-cariogenic (an overview can be found, for example, in the Journal of the American Dietetic Association 2004, 104 (2), 255-275). These non-nutritive, highly intensive sweeteners are in fact well suited in low usage concentrations to providing sweetness to foodstuffs, but unlike sugar often result in taste problems due their time-intensity profiles (for example sucralose, stevioside, cyclamate), a bitter and/or astringent aftertaste (for example acesulfame K, saccharin, stevioside), or marked additional aroma impressions (for example glycyrrhizin acid ammonium salt). Some sweeteners are not particularly stable under heat (for example thaumatin, brazzein, monellin), are not stable in all applications (for example aspartame) and sometimes have a very long-lasting sweetening effect (strong sweet aftertaste, for example saccharin).

In particular, the steviolglycosides that occur naturally in *Stevia* ssp. or *Rubus* ssp. (for example stevioside, rebaudiosides A-G, dulcoside, rubusoside, suaviosides A, B and G-J) are in fact already very good sweeteners, but in the concentrations necessary for an adequate sweetening effect (for example 400-600 ppm for rebaudioside A [purity>90%] in soft drinks, in order to achieve a sweetness corresponding to a 10% concentration) already exhibit a marked liquorice-like and unpleasant bitter astringent secondary and/or aftertaste.

In particular with sweet, calorie-free or very low calorie drinks, which are made using such sweeteners, this unpleasant secondary and/or aftertaste often lowers the sensory acceptance and must therefore be masked.

In the literature a number of possibilities are described. Thus U.S. 2004/0142084 describes alkaline metal hydrogen sulphates as masking agents. However, these increase the acid content in applications considerably. In U.S. Pat. No. 3,924,017 caffeic acid is proposed for masking. The disadvantage here is that caffeic acid itself has a slightly bitter taste and easily suppresses the sweetness, so that more sweetener would have to be used.

In WO 2006/087991 the unpleasant taste is suppressed using alkamides such as spilanthol, but often here the tingling effect of the substance group is undesirable and the range of applications is thus limited.

An improvement in the taste characteristics, in particular the aftertaste problem of non-nutritive, highly intensive sweeteners can be achieved by the use of tannic acid as, for example, described in WO 98/20753, or phenol acids as in U.S. Pat. No. 3,924,017. Even so, because of their catechol units such substances are not particularly stable in applications and as typical astringents they intensify at the very least this secondary or aftertaste.

The problem for the invention, therefore, was to indicate aroma compositions that reduce the unpleasant impression in the oral cavity left by particular sweeteners, specifically those made from *Stevia* ssp. or *Rubus* ssp., and preparations of these, in particular foodstuffs, pharmaceuticals and products consumed for pleasure, without losing the sweetening power and in the best case even allowing the quantity of sweeteners to be reduced.

This problem is solved in accordance with the invention by an aroma composition for reducing or suppressing an unpleasant (taste) impression in the oral cavity, comprising (i) one or more sweeteners including their physiologically tolerated salts, preferably selected from the group comprising:

magap, sodium cyclamate, acesulfame K, neohesperidin dihydrochalcone, saccharin, saccharin sodium salt, aspartame, superaspartame, neotame, alitame, sucralose, lugduname, carrelame, sucrononate, sucrooctate, and/or from the group of naturally occurring sweeteners comprising miraculin, curculin, monellin, mabinlin, thaumatin, curculin, brazzein, pentadin, D-phenylalanine, D-tryptophane, or extracts or fractions derived from natural sources containing these amino acids and/or proteins, neohesperidin dihydrochalcone, steviolgylcoside, stevioside, steviolbioside, rebaudiosides (for example rebaudioside A, rebaudioside B, rebaudioside C, rebaudioside D, rebaudioside E, rebaudioside F, rebaudioside G, rebaudioside H, dulcoside, rubusoside), suavioside A, suavioside B, suavioside G, suavioside H, suavioside I, suavioside J, baiyunoside 1, baiyunoside 2, phlomisoside 1, phlomisoside 2, phlomisoside 3, phlomisoside 4, abrusoside A, abrusoside B, abrusoside C, abrusoside D, cyclocaryoside A and cyclocaryoside I, oslandin, polypodoside A, strogin 1, strogin 2, strogin 4, selligueanin A, dihydroquercetin-3-acetate, perillartine, telosmoside $A_{15}$, periandrin I-V, pterocaryoside, cyclocaryoside, mukurozioside, trans-anethol, trans-cinnamaldehyde, bryoside, bryonoside, bryonodulcoside, carnosifloside, scandenoside, gypenoside, trilobtain, phloridzin, dihydroflavanol, hematoxylin, cyanin, chlorogenic acid, albiziasaponin, telosmoside, gaudichaudioside, mogroside, hernandulcine, monatin, glycyrrhetin acid and derivatives thereof (for example their glycosides such as glycyrrhizin) or their potassium, sodium, calcium or ammonium salts and phyllodulcin, and (ii) one or more bitter-masking aroma substances and/or flavourings including their physiologically tolerated salts, in each case selected from the group comprising hydroxyflavanones and their physiologically tolerated salts, hydroxybenzoic acid amides, in particular 4-hydroxybenzoic acid vanillyl amides, hydroxydeoxybenzoines hydroxyphenylalkandiones diacetyl trimers gamma-aminobutyric acids divanillins and optionally (iii) one or more additional aroma substances including their physiologically tolerated salts, whereby at least one of these aroma substances is a sweetness intensifying aroma substance and is selected from the group comprising hesperetin 4-hydroxydihydrochalcone, and propenylphenylglycoside (chavicol glycoside)

and optionally (iv) one or more inactive substances or carriers.

In the aroma composition in accordance with the invention the naturally occurring sweeteners can also be used in the form of extracts or enriched fractions of these extracts, in particular Thaumatococcus extracts (sweet prayers plant), extracts of *Stevia* ssp. (in particular *Stevia rebaudiana*), swingle extract (*Momordica* or *Siratia grosvenorii*, luo-han-guo), extracts of *Glycerrhyzia* ssp. (in particular *Glycerrhyzia glabra*), *Rubus* ssp. (in particular *Rubus suavissimus*), citrus extracts, extracts of *Lippia dulcis* and Buddha tea extracts (*Hydrangea dulcis* or *Hydrangea macrophylla*, called Amacha or other sweet phyllodulcin containing *Hydrangea* species) and corresponding enriched fractions of these extracts.

The hydroxyflavanone(s) in accordance with (ii) can in aroma compositions in accordance with the invention preferably be the hydroxyflavanones described in EP 1258200 A2, and can in particular be: 2-(4-hydroxyphenyl)-5,7-dihydroxychroman-4-one (naringenin), 2-(3,4-dihydroxyphenyl)-5,7-dihydroxychroman-4-one (eriodictyol), 2-(3,4-dihydroxyphenyl)-5-hydroxy-7-methoxychroman-4-one (eriodictyol-7-methylether), 2-(3,4-dihydroxyphenyl)-7-hydroxy-5-methoxychroman-4-one (eriodictyol-5-methylether) and 2-(4-hydroxy-3-methoxyphenyl)-5,7-dihydroxychroman-4-one (homoeriodictyol), their (2S) or (2R) enantiomers or mixtures of these and their monovalent or polyvalent phenolate salts with counteracting cation(s), in particular $Na^+$, $K^+$, $NH_4^+$, $Ca^{2+}$, $Mg^{2+}$, $Zn^{2+}$ or $Al^{3+}$ as counteracting cations. Particularly preferred hydroxyflavanones and hydroxyflavanone mixtures are described in more detail below.

In the aroma compositions in accordance with the invention, in accordance with (ii) the hydroxybenzoic acid amide(s) can preferably be those described in WO 2006/024587; particular preference is for 2,4-dihydroxybenzoic acid vanillyl amide, 2,4-dihydroxybenzoic acid-N-(4-hydroxy-3-methoxybenzyl)amide, 2,4,6-trihydroxybenzoic acid-N-(4-hydroxy-3-methoxybenzyl)amide, 2-hydroxybenzoic acid-N-4-(hydroxy-3-methoxybenzyl)amide, 4-hydroxybenzoic acid-N-(4-hydroxy-3-methoxybenzyl)amide, 2,4-dihydroxybenzoic acid-N-(4-hydroxy-3-methoxybenzyl)amide-mono-sodium salt, 2,4-dihydroxybenzoic acid-N-2-(4-hydroxy-3-methoxyphenyl)ethylamide, 2,4-dihydroxybenzoic acid-N-(4-hydroxy-3-ethoxybenzyl)amide, 2,4-dihydroxybenzoic acid-N-(3,4-dihydroxybenzyl)amide and 2-hydroxy-5-methoxy-N-[2-(4-hydroxy-3-methoxyphenyl)ethyl]amide and 4-hydroxybenzoic acid vanillyl amide.

Hydroxydeoxybenzoin(s) in accordance with (ii) of the aroma compositions in accordance with the invention can in particular be those described in WO 2006/106023, and are preferably 2-(4-hydroxy-3-methoxyphenyl)-1-(2,4,6-trihydroxyphenyl)ethanone, 1-(2,4-dihydroxyphenyl)-2-(4-hydroxy-3-methoxyphenyl)ethanone, and/or 1-(2-hydroxy-4-methoxyphenyl)-2-(4-hydroxy-3-methoxyphenyl)ethanone.

The aroma compositions in accordance with the invention can in accordance with (ii) contain one or more hydroxyphenylalkane diones, in particular those described in WO 2007/003527; preference is for gingerdione-[2], gingerdione-[3], gingerdione-[4], dehydrogingerdione-[2], dehydrogingerdione-[3], dehydrogingerdione-[4]).

The aroma compositions in accordance with the invention can in accordance with (ii) also or alternatively contain one or more diacetyltrimers, in particular as described in WO 2006/058893.

Gamma-aminobutyric acid(s) in accordance with (ii) of the aroma compositions in accordance with the invention can in particular be those described in WO 2005/096841, preference being for 4-aminobutyric acid (gamma-aminobutyric acid).

The aroma compositions in accordance with the invention can in accordance with (ii) contain one or more divanillins, in particular those described in WO 2004/078302, with preference for 6,6'-dihydroxy-5,5'-dimethoxy-biphenyl-3,3'-dicarbaldehyde.

Aroma compositions in accordance with the invention can contain one or more 4-hydroxydihydrochalcones in accordance with (ii), in particular those described in EP 1 972 203 and/or its priority document U.S. Ser. No. 60/894,557. Particular preference is for 2',4-dihydroxydihydrochalcone or 3-(4-hydroxyphenyl)-1-(2-hydroxyphenyl)propan-1-one, 2',4,4'-trihydroxydihydrochalcone or 3-(4-hydroxyphenyl)-1-(2,4-dihydroxyphenyl)propan-1-one (davidigenin), 2',4,6'-trihydroxydihydrochalcone or 3-(4-hydroxyphenyl)-1-(2,6-dihydroxyphenyl)propan-1-one, 2',4,4',6'-tetrahydroxydihydrochalcone or 3-(4-hydroxyphenyl)-1-(2,4,6-trihydroxyphenyl)propan-1-one (phloretin) 2',4-dihydroxy-3-methoxydihydrochalcone or 3-(4-hydroxy-3-methoxyphenyl)-1-(2-hydroxyphenyl)propan-1-one, 2',4,4'-trihydroxy-3-methoxydihydrochalcone or 3-(4-hydroxy-3-methoxyphenyl)-1-(2,4-dihydroxyphenyl)propan-1-one, 2',4,6'-trihydroxy-3-methoxydihydrochalcone or 3-(4-hydroxy-3-methoxyphenyl)-1-(2,6-dihydroxyphenyl)propan-1-one, 2',4,4',6'-tetrahydroxy-3-methoxydihydrochalcone or 3-(4-hydroxy-3-methoxyphenyl)-1-(2,4,6-trihydroxyphenyl)propan-1-one, 2',3,4,4',6'-tetrahydroxydihydrochalcone or 3-(3,4-dihydroxyphenyl)-1-(2,4,6-trihydroxyphenyl)propan-1-one (3-hydroxyphloretin) and 4,4'-dihydroxy-3-methoxy-dihydrochalcone or 3-(4-hydroxy-3-methoxyphenyl)-1-(4-hydroxyphenyl)propan-1-one.

Hesperitin in the sense of a component in accordance with (iii) of an aroma composition in accordance with the invention can be in particular the (2S) enantiomer, the (2R) enantiomer or a mixture of these enantiomers, as in particular described in WO 2007/014879.

The 4-hydroxydihydrochalcones optionally contained in accordance with (iii) in the aroma compositions in accordance with the invention can in particular be those described in WO 2007/107596.

Aroma compositions in accordance with the invention in accordance with (iii) can contain one or more propenylphenylglycosides (chavicol glycoside), in particular those described in EP 1955601 A1 and/or priority document U.S. Ser. No. 60/886,548; preference is for the alpha- or beta-anomers and quite particularly for the beta-anomers of 1-O-[4-(propen-2-enyl)phenyl]-D-glucopyranoside (chavicol glucoside), of 1-O-[4-(propen-2-enyl)phenyl]-6-O-β-D-apiofuranosyl-D-glucopyranoside (furcatin), of 1-O-[4-(propen-2-enyl)phenyl]-6-O-β-D-rutinoside and of 1-O-[4-(propen-2-enyl)phenyl]-O-β-D-xylopyranosyl-(1-6)-β-D-glucopyranoside (p-allylphenylprimeveroside, miyaginin).

Sweeteners in the sense of the invention are non-nutritive or only slightly nutritive, predominantly sweet tasting compounds or predominantly sweet tasting natural extracts or isolates, whereby such natural extracts or isolates do not contain the sweet tasting carbohydrates, in particular sugar or sugar alcohol, in a quantity that is sufficient to bring about a perceptible sweet taste in the preparation. Here the sweeteners in the sense of the invention must solely be in a position to generate a sweetening power in the preparation to be consumed (foodstuff, product consumed for pleasure), which would correspond to the sweetening power of a saccharose concentration of at least 5%.

Preferred homoeriodictyol potassium salts are those in which the counteracting cation is selected from the group comprising:

monovalent positively charged cations of the first main or auxiliary group, ammonium ion, trialkylammonium ion, bivalently charged cations of the second main or auxiliary group and trivalent cations of the 3rd main and auxiliary group. Particular preference is for $Na^+$, $K^+$, $Ca^{2+}$, $Mg^{2+}$ and $Zn^{2+}$.

Also preferred are homoeriodictyol alkaline salts and mixed salts thereof or mixtures with homoeriodictyol calcium salt. Likewise particularly preferred are homoeriodictyol potassium salt and mixed salts thereof or mixtures with homoeriodictyol calcium salt, since these surprisingly have a better solubility compared with pure homoeriodictyol sodium salt.

Particular preference is for an aroma composition in accordance with the invention containing at least one substance from each of the following groups (i), (ii) and (iii):

(i) one or more natural sweeteners selected from the group comprising:

thaumatin, brazzein, or extracts or fractions obtained from natural sources and containing these proteins, from neohesperidin dihydrochalcone, stevioside, rebaudioside A, rebaudioside C, dulcosides, mogrosides, monatin, glycyrrhetinic acid or its potassium, sodium, calcium or ammonium salts, glycyrrhizin or its potassium, sodium, calcium or ammonium salts and salts, hernandulcin and phyllodulcin, including extracts or enriched fractions of these sweeteners, preferred fractions of these extracts with more than 10% by weight, particularly preferred with more than 50% by weight and quite particularly preferred with more than 90% by weight of the sweetener concerned in relation to the dry mass of the fraction, particularly preferred are the following extracts and corresponding enriched fractions: Thaumatococcus extracts (sweet prayers plant), extracts of *Stevia* ssp. (in particular *Stevia rebaudiana*), swingle extract (*Momordica* or *Siratia grosvenorii*, Luo-Han-Guo), extracts of *Glycerrhyzia* ssp. (in particular *Glycerrhyzia glabra*), extracts of *Rubus* ssp. (in particular *Rubus suavissimus*), citrus extracts, extracts of *Lippia dulcis*, Buddha tea extracts (*Hydrangea dulcis* and other phyllodulcin-containing *Hydrangea* ssp.).

(ii) one, several or all of the bitterness-masking aroma substances and/or flavourings selected from the group comprising eriodictyol, sterubin, homoeriodictyol or their physiologically tolerated salts, 2,4-dihydroxybenzoic acid vanillylamide, 2,4,6-trihydroxybenzoic acid-N-(4-hydroxy-3-methoxybenzyl)amide, 2,4-dihydroxybenzoic acid-N-(4-hydroxy-3-methoxybenzyl)amide monosodium salt, gingerdione-[2], gingerdione-[3], gingerdione-[4], dehydrogingerdione-[2], dehydrogingerdione-[3], dehydrogingerdione-[4]), 4-aminobutyric acid, 6,6'-dihydroxy-5,5'-dimethoxy-biphenyl-3,3'-dicarbaldehyde;

and (iii) one or more additional aroma substances, whereby at least one of these aroma substances is a sweetness intensifying aroma substance and is selected from the group comprising:

hesperitin, in particular as described in WO 2007/014879, and in particular the (2S) enantiomer, the (2R) enantiomer or a mixture of these enantiomers, 4-hydroxydihydrochalcones, in particular as described in WO 2007/107596 whereby phloretin is again preferred and optionally (iv) one or more inactive substances or carriers.

Quite particular preference is for an aroma composition in accordance with the invention, containing at least one substance from each of the following groups (i), (ii) and (iii):

(i) one or more sweeteners selected from the group comprising stevioside, rebaudioside A, rebaudioside C, dulcosides, mogrosides, phyllodulcin, glycyrrhetinic acid, an extract of a *Stevia* ssp. (in particular *Stevia rebaudiana*), swingle extract (*Momordica* or *Siratia grosvenorii*), an extract of luo-han-guo, an extract of a *Glycerrhyzia* ssp. (in particular *Glycerrhyzia glabra*), and *Rubus* ssp. (in particular *Rubus suavissimus*), and Buddha tea (*Hydrangea dulcis* and other phyllodulcin-containing *Hydrangea* ssp.)

and in each case (ii) one, several or all the bitterness-masking aroma substances and/or flavourings selected from the group comprising homoeriodictyol or homoeriodictyol sodium salt or homoeriodictyol potassium salt or a mixed salt of homoeriodictyol sodium or potassium salt with homoeriodictyol calcium salt, 2,4-dihydroxybenzoic acid vanillyl amide, 2,4-dihydroxybenzoic acid-N-(4-hydroxy-3-methoxybenzyl)amide monosodium salt, gingerdione-[2], gingerdione-[3], and (iii) one or more additional aroma substances, whereby at least one of these aroma substances is a sweetness intensifying aroma substance selected from the group comprising: hesperitin, 4-hydroxydihydrochalcones in particular as described in WO 2007/107596, whereby phloretin is again preferred, and optionally (iv) one or more inactive substances or carriers.

Surprisingly it has been discovered that the aroma compositions in accordance with the invention can reduce or completely suppress a bitter and simultaneously astringent impression from the above-mentioned sweeteners (including in corresponding mixtures), without negatively affecting the sweetness in the process. On the contrary: the latter is intensified. Here the reduction in the unpleasant bitter and simultaneously astringent sensation can be achieved by alteration, masking or reduction. Reduction in the sense of the invention also includes the mitigation of a bitter and astringent aftertaste of one of the said sweeteners, in particular also if the corresponding unpleasant taste sensation results without the substances in accordance with the invention (ii) and optionally (iii) only in a combination between a sweetener and an additional substance.

Most often preferred is an aroma composition in accordance with the invention, containing at least one substance from each of the groups:

(i) one or more sweeteners selected from the group comprising stevioside, rebaudioside A, rebaudioside C, dulcosides, mogrosides, phyllodulcin, glycyrrhetinic acid, extracts of *Stevia* ssp. (in particular *Stevia rebaudiana*), in particular extracts of *Stevia* ssp., and (ii) one, several or all the bitterness-masking aroma substances and or flavourings selected from homoeriodictyol or homoeriodictyol sodium salt or homoeriodictyol potassium salt or a mixed salt of homoeriodictyol sodium or potassium salt with homoeriodictyol calcium salt, (iii) one or more additional aroma substances, whereby at least one of these aroma substances is a sweetness intensifying aroma substance and is selected from the group comprising: hesperitin, 4-hydroxydihydrochalcones as described in WO 2007/107596, whereby phloretin is again preferred, and optionally (iv) one or more inactive substances or carriers.

These most preferred aroma compositions have demonstrated quite particularly advantageous characteristics in (carbonated) drinks, so that (in particular carbonated) drinks containing such an aroma composition are likewise the subject matter of this application. Preferred carbonated drinks in accordance with the invention are carbonated fruit-containing soda pops (such as orange, lemon or citrus flavours), carbonated isotonic drinks (for example orange, lemon or citrus flavours), carbonated soft drinks (for example cola, citrus, orange, lemon, cherry, apple or vanilla flavours or mixtures of these), carbonated spritzers, carbonated fruit and vegetable juices, carbonated fruit or vegetable preparations.

Here, in the sense of the invention, carbonated means that the drink contains naturally yielded carbon dioxide (e.g. from fermentation processes as in beer production or from water from carbon dioxide-containing mineral sources) or that this carbon dioxide is added during the manufacturing and/or filling process.

For the (ii) bitterness-masking aroma substance and/or flavouring likewise some natural sources, mainly plant extracts, are known and can be used. For eriodictyol and homoeriodictyol or their physiologically tolerated salts, in particular the, or their sodium, potassium, calcium, magnesium and zinc salts, by way of example extracts of *Eriodictyon* ssp, preferably *Eriodictyon californicum, E. angustifolium* or *E. crassifolium* and for phloretin extracts of *Malus* ssp., predominantly as apple tree products, for example apple skin extract or enriched apple polyphenol extract, preferably apple skin treated enzymatically with glycosidases or with an acid ion exchanger or enriched apple polyphenol extract in the sense of the invention or can be employed.

The plant extracts can be obtained from the corresponding fresh or dried plants or plant parts, in particular however from plant parts of *Eriodictyon* ssp. or *Malus* ssp. Normally the dried plant parts (for example fresh or dried roots, fruits, seeds, peel, wood, stems, leaves or flower [parts]), preferably in shredded form, are extracted with a solvent suitable for foodstuffs and products consumed for pleasure at temperatures of between 0° C. and the boiling point of the respective solvent or solvent mixture, then filtered and the filtrate fully or partially concentrated, preferably by distillation, freeze- or spray-drying. The raw extract obtained in this way can then be further processed, for example by enzymatic treatment (for example with glycosidases to increase the yield of non-sugar-containing molecules), with acid (for example under pressure), with suitable basic solutions such as hydroxides, carbonates or hydrogen carbonates of corresponding (preferably alkaline and/or earth alkaline) metals, in particular of sodium, potassium, calcium, magnesium and zinc, treated with acid ion exchangers or with steam, usually at pressures of between 0.01 mbar and 100 bar, preferably at between 1 mbar and 20 bar, and/or included in a solvent suitable for foodstuffs and products consumed for pleasure. These solutions can also be further treated with basic solutions, for example of hydroxides, carbonates or hydrogen carbonates of preferably sodium, potassium, calcium, magnesium and zinc, whereby this is preferably the cation not used in the respective solution of the manufacturing procedure described previously.

Extraction solvents that are particularly suitable for foodstuffs and products consumed for pleasure are water, ethanol, methanol, propylene glycol, glycerine, acetone, dichloromethane, acetic acid ethyl ester, diethyl ether, hexane, heptane, triacetine, vegetable oils or fats, supercritical carbon dioxide and mixtures thereof.

Preferred inactive substances or carriers are maltodextrin, starch, natural or synthetic polysaccharides and/or vegetable gums such as modified starch or gum Arabic, solvents permitted for the aroma compositions such as for example ethanol, 1,2-propylene glycol, water, glycerine, triacetine, vegetable oil triglycerides, colorants, for example permitted food colourings, colouring vegetable extracts, stabilisers, preservatives, antioxidants and viscosity modifiers.

In a preferred aroma composition in accordance with the invention the components from group (i) are used in a ratio to the components of group (ii) of between 1:10 and 1000:1, preferably between 1:1 and 300:1 with particular preference for between 3:1 and 100:1, in each case relating to the weight ratio of the two components.

Where present the components from group (iii) in accordance with the invention are preferably used in the aroma compositions in accordance with the invention in a ratio of between 3:1 and 1:1000 but preferably in a ratio of between 1:1 and 1:300 and particularly preferably between 1:2 and 1:100, whereby the ratio represents the weight ratio of the weight of the components from group (iii) to the total weights of the components from groups (i) and (ii).

Where present in accordance with the invention the components from group (iv) are preferably used in a ratio of between 100:1 and 1:1, preferably 20:1 to 2:1, with the ratio representing the weight ratio of the components from group (iv) to the total weights of the components from group (i), (ii) and (iii).

A particularly preferred aroma composition in accordance with the invention contains at least one component for intensifying a salty, possibly slightly acidic and/or umami taste impression. Thus the aroma compositions in accordance with the invention are used in combination with at least one (additional) substance suitable for intensifying a pleasant taste impression (salty, umami, possibly slightly acidic). Preference here is for salty-tasting compounds and salt intensifying compounds. Preferred compounds are disclosed in WO 2007/045566. Also preferred are umami compounds as described in WO 2008/046895 and EP 1 989 944 and/or their priority documents U.S. Ser. No. 60/829,958 or U.S. Ser. No. 60/916,589.

A preferred aroma composition in accordance with the invention preferably contains at least one compound that can generate bitter and astringent impressions in the oral cavity, whereby these impressions are reduced and preferably not noticeable as a result of the compounds from groups (i) and (ii) that are contained.

Examples of such compounds which may produce bitter and simultaneously astringent and optionally cardboardy, dusty, dry, floury, rancid or metallic impressions in the oral cavity are: xanthine alkaloids, xanthines (caffeine, theobromine, theophylline and methylxanthines), alkaloids (quinine, brucine, strychnine, nicotine), phenolic glycosides (for example salicin, arbutin), flavonoid glycosides (for example neohesperidin, hesperetin-7-O-glucoside, hesperidin, naringin, naringenin-7-O-glucoside, quercitrin, rutin, hyperosides, quercitron, isoquercitrin, avicularin), isoflavonoids or the glycosides thereof (for example daidzin, genistin and the acyl or malonyl esters thereof), bitter tasting chalcones or chalcone glycosides (for example phloridzin, phloretin-2-O'-xyloglucoside, isoxanthohumol), hydrolysable tannins (gallic or ellagic acid esters of carbohydrates, for example pentagalloylglucose), non-hydrolysable tannins (optionally galloylated catechins or epicatechins and the oligomers thereof, for example proanthyocyanidines or procyanidines, thearubigin), flavones (for example quercetin, taxifolin, myricetin) and glycosides thereof (for example rutin, quercitrin), phenols such as for example thymol, eugenol, polyphenols (for example hydroxycinnamic acids and the esters thereof such as gamma-oryzanol, caffeic acid or the esters and derivatives thereof, for example chlorogenic acid, neochlorogenic acid, cryptochlorogenic acid, chlorogenic acid lactone), terpenoid bitter substances (for example limonoids, such as limonin or nomilin from citrus fruits, lupolones and humulones as well as iso-alpha acids from hops), iridoids, secoiridoids, triterpene glycosides such as P57A and related active ingredients from *Hoodia gordonii*, absinthin from wormwood, amarogehtin from gentian, metallic salts from mineral and carbon acids (in particular potassium, magnesium and calcium salts, potassium chloride), preferred carbon acids here are citric acid, tartaric acid, phosphoric acid, maleic acid, adipinic acid, succinic acid, malic acid, fumaric acid, ascorbic acid (vitamin C) and lactic acid, potassium gluconate, potassium carbonate, potassium sulphate, potassium lactate, potassium glutamate, potassium succinate, potassium malate, sodium sulphate, magnesium sulphate), pharmaceutical active ingredients (for example fluoroquinolone antibiotics, paracetamol, aspirin, beta.-lactam antibiotics, ambroxol, propylthiouracil [PROP], guaifenesin), vitamins (for example vitamin H, B-series vitamins such as vitamin B1, B2, B6, B12, niacin, pantothenic acid), denatonium benzoate, sucralose octaacetate, iron salts, aluminium salts, zinc salts, urea, unsaturated fatty acids, in particular unsaturated fatty acids in emulsions, bitter-tasting amino acids (for example L-leucine, L-isoleucine, L-valine, L-tryptophan, L-proline, L-histidine, L-tyrosine, L-lysine or L-phenylalanine) and bitter-tasting peptides (in particular peptides with an amino acid from the group comprising L-leucine, L-isoleucine, L-valine, L-tryptophan, L-proline or L-phenylalanine at the N or C terminus) or cyclical dipeptides (for example cyclo-Val-Pro, cyclo-leu-pro).

Preferred substances which taste bitter, astringent, cardboardy, dusty, dry, floury; rancid or metallic are caffeine, theobromine and theophylline, quinine, salicin, arbutin, neohesperidin, naringin, quercetin, rutin, daidzin, genistin and the acyl or malonyl esters thereof, phloridzin, gallic or ellagic acid esters of carbohydrates (for example pentagalloylglucose), optionally galloylated catechins or epicatechins, proanthyocyanidines or procyanidines, thearubigin, quercetin, taxifolin, myricetin, gamma-oryzanol, caffeic acid or esters thereof (for example chlorogenic acid and isomers), limonoids such as limonin or nomilin from citrus fruits, lupolones and humulones and iso-alpha acids from hops, triterpene glycosides such as P57A and related active ingredients from *Hoodia gordonii*, absinthin from wormwood, amarogentin from gentian, metallic salts (in particular potassium, magnesium and calcium salts, potassium chloride, potassium gluconate, potassium carbonate, potassium sulphate, potassium lactate, potassium glutamate, potassium succinate, potassium malate, sodium sulphate, magnesium sulphate) and pharmaceutical active Ingredients (for example fluoroquinolone antibiotics, paracetamol, aspirin, beta-lactam antibiotics, ambroxol, propylthiouracil [PROP], guaifenesin).

Compounds which may produce a bitter, astringent and optionally cardboardy, chalky, dusty, dry, floury, rancid or metallic aftertaste in the oral cavity may be aroma substances or flavourings having a not unpleasant primary taste (for example sweet, salty, spicy, sour) and/or odour and may belong, for example, to the group comprising sugar substitutes or aroma substances. Examples which may be mentioned are: potassium salts (in particular potassium chloride, potassium gluconate, potassium carbonate, potassium sulphate, potassium lactate, potassium glutamate, potassium succinate, potassium malate).

Here primary taste means the taste impression that is made while the foodstuff, product consumed for pleasure or drink, or other oral preparation is in direct contact with the mucous lining of the oral cavity, in particular with the tongue (as a rule lasting from a few seconds to a few minutes). Aftertaste here means the taste impression that is left once the oral cavity has been emptied by swallowing and/or disgorging and which through the adhesion of residues of the foodstuff, product consumed for pleasure or drink or other oral preparations remains in place and can stay there for between a few minutes and a few hours.

In accordance with that stated above, the aroma compositions in accordance with the invention are particularly well-suited to being combined with mixtures of substances and preparations, in particular foodstuffs, pharmaceutical/medicines, oral care products or products consumed for pleasure, which contain sweeteners, which may generate a bitter and astringent, and optionally a cardboardy, limy, dusty, dry, floury; rancid or metallic (after)taste in the oral cavity. Here particular reference is made to the above list of examples of these compounds.

In accordance with the invention a preparation containing an aroma composition in accordance with the invention is also specified.

Such a preparation is preferably a pharmaceutical preparation, a semi-finished good, intended directly for nutrition or pleasure and/or a preparation for oral care.

Preference is given to preparations according to the invention wherein, relative to the total preparation, the concentration of at least one, preferably of the total of all of the components of group (i), lies in the range from 1 to 1,000 ppm, preferably from 5 to 1,000 ppm, particularly preferably from 5 to 500 ppm and the total quantity of the components from group (ii) is from 0.5 to 300 ppm, preferably from 2 to 150 ppm, particularly preferably from 3 to 150 ppm and preferably the total quantity of components from group (iii) is from 0.1 to 500 ppm, preferably from 1 to 200 ppm, and particularly preferably from 3 to 100 ppm.

Further preference is given to preparations according to the invention, wherein the total quantity of all the components (i), (ii) and (iii) relative to the total preparation lies in the range from 5 to 2000 ppm, preferably in the range from 20 to 1,000 ppm, particularly preferably in the range from 40 to 700 ppm.

As already mentioned, one aspect of the present invention relates to the use of the aroma compositions according to the invention to mask or reduce the unpleasant taste impression of a sweetener, i.e. as a flavour-correcting agent. Preferably, the aroma compositions according to the invention are introduced into a pharmaceutical preparation formulated for oral consumption or into a preparation serving for nutrition, oral care or pleasure, wherein the preparation conventionally comprises one or more unpleasant, i.e. bitter-, astringent-tasting substances.

The proportion of aroma compositions in accordance with the invention in a preparation in accordance with the invention is preferably 0.000001% by weight to 95% by weight, in relation to the total weight of the preparation.

Particular preference is given to preparations according to the invention which comprise at least one bitter and one astringent-tasting substance, the amount of the bitter and of the astringent-tasting substance being sufficient to be perceived as an unpleasant taste in a comparison preparation not comprising any aroma composition according to the invention but otherwise identically composed, and the amount of the aroma composition according to the invention in the preparation being sufficient to modify organoleptically, mask or reduce the unpleasant taste impression of the bitter and the astringent-tasting substance in comparison with the comparison preparation.

Preparations according to the invention may also take the form of a semi-finished product, an odoriferous, aroma or flavouring substance composition or a seasoning mixture.

Preparations according to the invention which serve as semi-finished products generally contain 0.0001% by weight to 95% by weight, preferably 0.001 to 80% by weight, in particular 0.01% by weight to 50% by weight, relative to the total weight of the preparation, of an aroma composition according to the invention. Preparations according to the invention which are present as semi-finished products may serve to mask or reduce the unpleasant taste impression of finished product preparations which are produced using the semi-finished product preparation.

Preparations serving for nutrition or pleasure for the purposes of the invention are for example bakery products (for example bread, dry biscuits, cakes, other pastry products), confectionery (for example chocolates, chocolate bar products, other bar products, fruit gums, hard and soft caramels, chewing gum), alcoholic or non-alcoholic beverages (for example coffee, tea, iced tea, wine, beverages containing wine, beer, beverages containing beer, liqueurs, spirits, brandies, (carbonated) fruit-containing beverages, (carbonated) isotonic beverages, (carbonated) soft drinks, nectars, spritzers, fruit and vegetable juices, fruit or vegetable juice preparations, instant beverages (for example instant cocoa beverages, instant tea beverages, instant coffee beverages, instant fruit beverages), meat products (for example ham, fresh or cured sausage preparations, spiced or marinated fresh or cured meat products), eggs or egg products (dried egg, egg white, egg yolk), cereal products (for example breakfast cereals, muesli bars, precooked ready rice products), dairy products (for example milk beverages, buttermilk beverages, milk ice cream, yoghurt, kefir, curd cheese, soft cheese, hard cheese, dried milk powder, whey, whey beverages, butter, buttermilk, partially or fully hydrolyzed milk protein-containing products), products made from soya protein or other soya bean fractions (for example soya milk and products made therefrom, fruit beverages with soya protein, soya lecithin-containing preparations, fermented products such as tofu or tempe or products made therefrom), products from other vegetable sources of protein, for example oat protein drinks, fruit preparations (for example jams, fruit ice cream, fruit sauces, fruit fillings, frozen fruit products or fruit sorbets), vegetable preparations (for example ketchup, sauces, dried vegetables, deep-frozen vegetables, precooked vegetables, preserved vegetables), snack articles (for example baked or fried potato chips or potato dough products, maize- or peanut-based extrudates), fat- or oil-based products or emulsions thereof (for example mayonnaise, remoulade, dressings), other ready-to-serve meals and soups (for example dried soups, instant soups, precooked soups), spices, seasoning mixtures and in particular powdered seasonings, which are for example used in snack food applications. The preparations for the purposes of the invention may also be used as semi-finished products for the production of further preparations serving for nutrition or for pleasure. The preparations for the purposes of the invention may also be nutritional supplements in the form of capsules, tablets (uncoated and coated tablets, for example coatings resistant to gastric juices), sugar-coated tablets, granules, pellets, mixtures of solids, dispersions in liquid phases, as emulsions, as powders, as solutions, as pastes or as other swallowable or chewable preparations.

Particularly preferred preparations serving for nutrition or pleasure for the purposes of the invention are alcoholic drinks such as beer mixture drinks, wine mixture drinks or other mixed drinks containing a maximum of 5% by volume of alcohol and/or non-alcoholic drinks such as tea, iced tea (sweetened, for example with herbal flavourings or fruit flavourings such as lemon or orange), (carbonated) fruit-containing soda pops (such as orange, lemon or citrus flavours), (carbonated) isotonic drinks (for example orange, lemon or citrus flavours), carbonated soft drinks (for example cola, citrus, orange, lemon, cherry, apple or vanilla flavours or mixtures of these), nectars, spritzers, milk drinks, buttermilk drinks, yoghurt, kefir, whey drinks, soya milk and products manufactured therefrom, fruit drinks with soya protein, oat protein drinks, and instant drinks (for example instant cocoa beverages, instant tea beverages, instant coffee beverages, instant fruit beverages), so-called flavoured water (near water drinks, whereby the latter must have a sweetening).

Near water drinks for the purposes of the invention are (carbonated) drinks with a (mineral) water basis, which are usually clear, only slightly coloured, often only weakly sweetened (less than 5% sucrose or sweeteners with a sweetening power of less than 5% sucrose), usually with little or no acidity and thus with a pH range of 4 to 8, are usually only flavoured and can still be provided with minerals, vitamins and/or plant extracts. Unlike most other drinks (e.g. soda pops, fruit juice drinks, [iced] tea drinks, and so on) here the "water" character of the drink is always still at the forefront.

Preference here is for drinks that have a pH of less than 7, particularly preferably less than 5, and especially preferably less than 4.

Further particularly preferred preparations serving for nutrition or pleasure for the purposes of the invention are dairy products (for example milk beverages, buttermilk beverages, milk ice cream, yoghurt, kefir, curd cheese, soft cheese, dried milk powder, whey, whey beverages, butter, buttermilk, partially or fully hydrolyzed milk protein-containing products), products made from soya protein or other soya bean fractions (for example soya milk and products made therefrom, fruit beverages with soya protein, products from other vegetable sources of protein, for example oat protein drinks, and fruit preparations (for example jams, fruit ice cream, fruit sauces, fruit fillings, frozen fruit products or fruit sorbets). Especially preferred are preparations containing a reduced level of sweet carbohydrates or no added sweet carbohydrates.

Preparations according to the invention serving for oral care are in particular oral and/or dental care products such as toothpastes, tooth gels, tooth powders, mouthwashes, chewing gum and other oral care products.

Pharmaceutical preparations comprise a pharmaceutical active ingredient. Advantageous pharmaceutical active ingredients are for example steroidal anti-inflammatory substances of the corticosteroid type, such as for example hydrocortisone, hydrocortisone derivatives such as hydrocortisone 17-butyrate, dexamethasone, dexamethasone phosphate, methylprednisolone or cortisone.

Advantageous non-steroidal pharmaceutical active ingredients are for example anti-inflammatory drugs such as oxicams such as piroxicam or tenoxicam; salicylates such as Aspirin®, (acetylsalicylic acid), disalcid, solprin or fendosal; acetic acid derivatives such as diclofenac, fenclofenac, indomethacin, sulindac, tolmetin, or clindanac; fenamates such as mefenamic, meclofenamic, flufenamic or niflumic; propionic acid derivatives such as ibuprofen, naproxen, flurbiprofen, benoxaprofen or pyrazoles such as phenylbutazone, oxyphenylbutazone, febrazone or azapropazone.

Particularly preferred pharmaceutical preparations are products which are not available by prescription only and freely purchasable medicaments, i.e. OTC ("over the counter") preparations, containing active ingredients such as paracetamol, acetylsalicylic acid or ibuprofen, vitamins (for example vitamin H, B-series vitamins such as vitamin B1, B2, B6, B12, niacin, pantothenic acid, preferably in the form of (effervescent) tablets or capsules), minerals (preferably in the form of (effervescent) tablets or capsules) such as iron salts, zinc salts, selenium salts, products containing active ingredients or extracts of ribwort (for example in cough syrup) or St. John's wort.

Further conventional active ingredients, basic materials, inactive substances and additives for preparations serving for nutrition, oral care or pleasure may be present in quantities of 5 to 99.999999% by weight, preferably of 10 to 80% by weight, relative to the total weight of the preparation. The preparations may furthermore comprise water in an amount of up to 99.999999% by weight, preferably of 5 to 80% by weight, relative to the total weight of the preparation.

The preparations according to the invention, containing the aroma composition according to the invention, are produced according to a preferred development, by incorporating the constituents of groups (i), (ii) and optionally also (iii) of the aroma composition according to the invention as substances, as a solution or in the form of a mixture with a solid or liquid carrier, into a basic oral pharmaceutical preparation or a basic preparation serving for nutrition, oral care or pleasure. Preparations according to the invention in the form of a solution may advantageously also be converted into a solid preparation by spray drying.

According to a further preferred embodiment, preparations according to the invention may be produced by incorporating the aroma composition according to the invention and optionally other constituents of the preparation according to the invention into emulsions, into liposomes, for example starting from phosphatidyl choline, into microspheres, into nanospheres or also into capsules, granules or extrudates prepared from a matrix suitable for foodstuffs and products consumed for pleasure, for example prepared from starch, starch derivatives, cellulose or cellulose derivatives (for example hydroxypropylcellulose), other polysaccharides (for example alginate), natural fats, natural waxes (for example beeswax, carnauba wax) or from proteins, for example gelatine.

In a further preferred production method, the aroma composition according to the invention is previously complexed with one or more suitable complexing agents, for example with cycloglycans, for example cyclofructans, cyclodextrins or cyclodextrin derivatives, preferably alpha-, gamma- and beta-cyclodextrin, and used in this complexed form.

One preparation which is particularly preferred according to the invention is one in which the matrix is so selected that the aroma composition according to the invention is released by the matrix in a delayed manner, such that a long-lasting effect is obtained.

The further constituents for preparations according to the invention may comprise conventional basic materials, inactive substances and additives for foodstuffs or products consumed for pleasure. Some of these substances have an unpleasant taste in that they have a bitter, astringent effect.

Examples of conventional basic materials, inactive substances and additives for preparations according to the invention are water, mixtures of fresh or processed, plant or animal basic or raw materials (for example raw, roasted, dried, fermented, smoked and/or boiled meat, bone, cartilage, fish, vegetables, fruit, herbs, nuts, vegetable or fruit juices or pastes or mixtures thereof), digestible or non-digestible carbohydrates (for example sucrose, maltose, fructose, glucose, dextrins, amylose, amylopectin, insulin, xylans, cellulose), sugar alcohols (for example sorbitol), natural or hardened fats (for example tallow, lard, palm fat, coconut oil, hardened vegetable fat), oils (for example sunflower oil, peanut oil, maize germ oil, olive oil, fish oil, soya oil, sesame oil), fatty acids or the salts thereof (for example potassium stearate), proteinogenic or non-proteinogenic amino acids and related compounds (for example taurine), peptides, native or processed proteins (for example gelatine), enzymes (for example peptidases), nucleic acids, nucleotides, taste-correcting agents for unpleasant taste impressions other than those described above, taste-correcting agents for further, generally not unpleasant taste impressions, taste-modulating substances (for example inositol phosphate, nucleotides such as guanosine monophosphate, adenosine monophosphate or other substances such as sodium glutamate or 2-phenoxypropionic acid), emulsifiers (for example lecithins, diacylglycerols), stabilisers (for example carageenan, alginate), preservatives, (for example benzoic acid, sorbic acid), antioxidants (for example tocopherol, ascorbic acid), chelating agents (for example citric acid), organic or Inorganic acidulants (for example malic acid, acetic acid, citric acid, tartaric acid, phosphoric acid), additional bitter substances (for example quinine, caffeine, limonin, amarogentin, humulone, lupulone, catechins, tannins), mineral salts (for example sodium chloride, potassium chloride, magnesium chloride, sodium phosphate), substances preventing enzymatic browning (for example sulphite, ascorbic acid), essential oils, plant extracts, natural or synthetic dyes or colouring pigments (for example carotenoids, flavonoids, anthocyans, chlorophyll and the derivatives thereof), spices, synthetic, natural or nature-identical aroma substances or odoriferous substances and odour-correcting agents.

Dental care products (as the basis for preparations serving for oral care) which contain the aroma composition according to the invention preferably comprise an abrasive system (abrasive or polishing agent), such as for example silicas, calcium carbonates, calcium phosphates, aluminium oxides and/or hydroxyapatites, surface-active substances such as for example sodium lauryl sulphate, sodium lauryl sarcosinate and/or cocamidopropyl betaine, humectants such as for example glycerol and/or sorbitol, thickeners, such as for example carboxymethylcellulose, polyethylene glycols, carrageenan and/or Laponite®, other taste-correcting agents for unpleasant taste impressions, taste-correcting agents for further, generally not unpleasant taste impressions, taste-modulating substances (for example inositol phosphate, nucleotides such as guanosine monophosphate, adenosine monophosphate or other substances such as sodium glutamate or 2-phenoxypropionic acid), cooling active ingredients such as for example menthol, menthol derivatives (for example L-menthol, L-menthyl lactate, L-menthyl alkylcarbonates, menthone ketals, menthane carboxamides), 2,2,2-trialkylacetamides (for example 2,2-diisopropylpropionic acid methylamide), icilin derivatives, stabilisers and active ingredients, such as for example sodium fluoride, sodium monofluorophosphate, tin difluoride, quaternary ammonium fluorides, zinc citrate, zinc sulphate, tin pyrophosphate, tin dichloride, mixtures of different pyrophosphates, triclosan, cetylpyridinium chloride, aluminium lactate, potassium citrate, potassium nitrate, potassium chloride, strontium chloride, hydrogen peroxide, aromas, sodium bicarbonate and/or odour-correcting agents.

Chewing gums (as a further example of preparations serving for oral care) which contain aroma compositions according to the invention preferably comprise a chewing gum base, i.e. a chewable mass which becomes plastic on chewing, sugars of various kinds, sugar substitutes, sweeteners, sugar alcohols, other taste-correcting agents for unpleasant taste impressions, taste-correcting agents for further, generally not unpleasant taste impressions, taste-modulating substances (for example inositol phosphate, nucleotides such as guanosine monophosphate, adenosine monophosphate or other substances, such as sodium glutamate or 2-phenoxypropionic acid), the cooling active ingredients, humectants, thickeners, emulsifiers, aromas, stabilisers and/or odour-correcting agents mentioned in the previous section.

Preferred preparations according to the invention are preparations serving for nutrition, oral, care or pleasure, with regard to the composition of which the above applies.

The preparations according to the invention serving for nutrition, oral care or pleasure are regularly products which are intended to be introduced into the human oral cavity, to remain there for a specific time and then either to be consumed (for example foodstuffs ready for consumption) or removed from the oral cavity (for example chewing gum or toothpaste). It goes without saying that the use of aroma compositions according to the invention is intended in every type of such products. These products include all substances or products which are intended to be taken into the human oral cavity in the processed, partially processed or unprocessed state. This category also includes substances which are added to foodstuffs during production, processing or treatment thereof and are intended to be introduced into the human oral cavity.

It goes without saying that the aroma compositions according to the invention may be used in particular in foodstuffs. Within the context of the present text, "foodstuff" is taken to mean in particular substances which are intended to be swallowed by a person and then digested in an unmodified, prepared or processed state; foodstuffs are also understood in this respect to mean casings, coatings or other encapsulations which are intended also to be swallowed or for which swallowing is to be anticipated. Certain products which are conventionally removed from the oral cavity (for example chewing gum) are understood in the context of the present text to be foodstuffs, since it is not to be ruled out that they will be swallowed at least in part.

In particular, the aroma compositions according to the invention are used in foodstuffs which are ready for consumption. A foodstuff which is ready for consumption should here be understood to mean a foodstuff which is already fully assembled with regard to the substances which decide taste. The phrase "foodstuff ready for consumption" also covers corresponding beverages and solid or semisolid foodstuffs ready for consumption. Examples which may be mentioned are deep-frozen products, which have to be thawed prior to consumption and heated to consumption temperature. Products such as yogurt or ice cream and also chewing gum or hard caramels count as foodstuffs ready for consumption.

For the purposes of the invention, a preparation (oral care product, also known as oral hygiene product or oral hygiene preparation) serving for oral care is a preparation for cleaning and caring for the oral cavity and the pharynx and for freshening breath. This expressly includes care of the teeth and gums. Dosage forms of customary oral hygiene formulations are creams, gels, pastes, foams, emulsions, suspensions, aerosols, sprays and capsules, granules, pastilles, tablets, candies or chewing gums, this list being understood not to be limiting for the purposes of the present invention.

The aroma compositions according to the invention may also be used, as already stated, in semi-finished foodstuff products. The term semi-finished foodstuff product relates to foodstuffs which are intended only to be consumed after further processing, for example after the addition of aroma or taste substances which are (co)decisive with regard to the organoleptic impression.

As stated above, part of the invention also relates to the use of an aroma composition according to the invention (preferably without a compound which may produce bitter, astringent impressions in the oral cavity) to reduce or suppress a bitter, astringent effect of a compound.

When used according to the invention, it may be advantageous for not all the bitter-tasting nuances (the same also applies optionally to the astringent effect) to be masked, since these may also be desirable under certain circumstances.

Part of the invention is also a method of reducing or suppressing the bitter, astringent effect of a sweetener, comprising the steps a) providing a sweetener, which may have a bitter, astringent secondary and/or aftertaste in the oral cavity, b) providing an aroma composition according to the invention and c) mixing the components provided in steps a) and b) in a ratio to one another such that the sweetener with the bitter, astringent effect displays this effect only to a lesser degree or not at all on introduction of the mixture into the oral cavity.

The invention will be explained further below with the assistance of examples and the claims. The examples serve to clarify the invention, without limiting the scope of protection of the claims. Unless otherwise stated, all data relate to the weight.

EXAMPLES

Example 1

Production of Homoeriodictyol Potassium Salt

The homoeriodictyol potassium salt is produced as described in the examples of WO 2004/041804 A2, whereby for the precipitation a potassium carbonate solution (10% by weight $K_2CO_3$ in water) is used instead of sodium hydroxide or sodium carbonate solution. The product is filtered, washed and dried in accordance with the method indicated in this publication.

Example 2

Production of a Homoeriodictyol Potassium Calcium Salt

Similarly to Example 1 a potassium/calcium carbonate solution (10% by weight $K_2CO_3$ and 1% by weight $Ca_2CO_3$ in water) is used for precipitation.

Example 3

Solubility of the Salts from Example 1 and Example 2

The solubility of the homoeriodictyol sodium salt and the salts produced in Example 1 and Example 2 is determined by the production of a saturated solution, filtering of this and then HPLC determination of the homoeriodictyol content.

| Substance | Solubility in water (g/litre) | Solubility in water, containing 1.5 g/l citric acid (g/litre) |
|---|---|---|
| Homoeriodictyol sodium salt | 2.8 | 3.8 |
| Example 1 | 7.0 | 5.1 |
| Example 2 | 10.0 | 5.4 |

Example 4

Production of a Homoeriodictyol Potassium Salt 2.5 g homoeriodictyol sodium salt (in accordance with WO 2004/041804) are dissolved in 44 g 1,2-propylene glycol and heated to 75° C. Following the addition of 0.92 g acetic acid this temperature is maintained for a further 30 minutes. Then 8.6 g of a 10% solution of potassium hydroxide in 1,2-propylene glycol are added and the mixture is stirred for a further 30 minutes without heating. Following cooling to approximately 20° C., 44 g of 1,2-propylene glycol are added to the mixture obtained which goes on to be used as is, for example in the production of aroma compositions or for the production of preparations serving for nutrition or pleasure.

Example 5

Flavor Modulation Effect of a Aroma Composition

Aqueous solutions containing 50 mg/kg, 150 mg/kg, and 300 mg/kg Rebaudioside A (>95% according to specification) were prepared (blind samples). Additionally, aqueos solutions containing 50 mg/kg, 150 mg/kg, and 300 mg/kg Rebaudioside A and additionally 7 mg/kg hesperetin, 25 mg/kg phloretin, and 10 mg/kg homoeriodictyol sodium salt were prepared (test samples). The blind samples and the test samples (the panelists did not know which samples they got) were tested each by 18 panelists against 10 different concentrated aqueous sucrose solutions (1, 2, 3, 4, 5, 6, 7, 8, 9, and 10%, coded 1-10, the panelists did not know the concentrations, but the sucrose solutions are sorted by increasing sucrose content). The panelist had to rate the equivalent sweetness by naming the most similar sucrose solution in respect to sweet taste. The sucrose equivalent in % was calculated as mean value of all panelist results.

For bitterness determination, the panelists trained for rating various bitter tasting compounds (e.g. caffeine, quinine) were asked to rate the bitterness of each blind sample and each test sample, respectively (the panelists did not know which sample they got in the session) by marking it on an unstructured scale of 10 cm with the left end defined as "no bitterness" and the right end as "strongest bitterness" by experience. The relative position of the marker was calculated as % bitter intensity. The tests were performed directly after determination of the sweetness as mentioned above.

In the following figures, the sucrose equivalents and the relative bitterness is given.

FIG. 1: shows the sweetness of 50, 150, 300 mg/kg rebaudioside A solutions (blind samples) compared to 50, 150, 300 mg/kg rebaudioside A solutions containing an aroma composition according to example 5. Sweetness was determined by 18 panelists by comparing to sucrose solutions of different concentrations.

Figure 2:
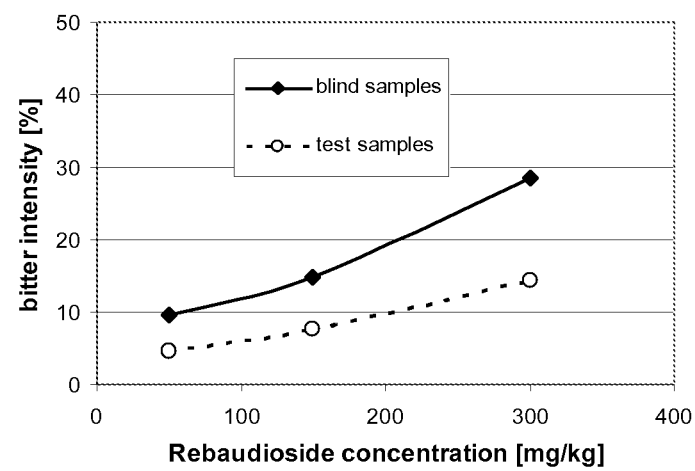

FIG. 2: shows the sweetness of 50, 150, 300 mg/kg rebaudioside A solutions (blind samples) compared to 50, 150, 300 mg/kg rebaudioside A solutions containing an aroma composition according to example 5. Sweetness was determined by 18 panelists by comparing to sucrose solutions of different concentrations.

The figures show clearly that the aroma compositions can reduce the bitterness of rebaudioside A solutions and are able to increase the sweetness of rebaudiosides simultanously. Therefore, it also possible to lower the amount of rebaudioside A in a certain application containing the inventive aroma compositions without loss of sweetness.

Application Example 1

Aroma Compositions

Preparations A-C: comparison preparations

Preparations D-H: preparations in accordance with the invention

| | Preparation (use in % by weight) | | | | | | | |
|---|---|---|---|---|---|---|---|---|
| Ingredient | A | B | C | D | E | F | G | H |
| Stevioside | 99.40 | | | 94.70 | | | | |
| Rebaudioside A 90% | | 99.50 | | | 95.54 | | | |
| Rebaudioside A 98% | | | 100 | | | 80.00 | 70.09 | 70.09 |
| Neohesperidin-dihydro-chalcone | 0.60 | 0.50 | | 0.57 | 0.48 | | 0.70 | 0.70 |
| Homo-eriodictyol sodium salt | | | | | | 16.00 | 23.36 | |
| Homo-eriodictyol potassium salt | | | | | | | | 23.36 |
| Phloretin | | | | 3.79 | 3.18 | 3.20 | 4.67 | 4.67 |
| Hesperetin | | | | 0.95 | 0.80 | 0.80 | 1.17 | 1.17 |

The substance or solutions are mixed and used in the ratios of quantities indicated above.

Application Example 2

Aroma Solutions

The compositions from Example 1 can also be incorporated with propylene glycol or an ethanol/water mixture, for example as a 10% solution, and fully dissolved by gentle heating.

Application Example 3

"Lemon" Flavoured Soft Drink

Comparison preparations (A-C)
Preparation according to the invention, containing aroma compositions according to the invention (D-J)

| Ingredient | \multicolumn{10}{c}{Preparation (use as a % by weight)} |
|---|---|---|---|---|---|---|---|---|---|---|
| | A | B | C | D | E | F | G | H | I | J |
| Aroma composition A from Example 1 | 0.05 | | | | | | | | | |
| Aroma composition B from Example 1 | | 0.05 | | | | | | | | |
| Aroma composition C from Example 1 | | | 0.05 | | | | | | | |
| Aroma composition D from Example 1 | | | | 0.05 | | | | | | |
| Aroma composition E from Example 1 | | | | | 0.05 | | | | | |
| Aroma composition F from Example 1 | | | | | | | 0.05 | | 0.02 | |
| Aroma composition G from Example 1 | | | | | | | | 0.05 | | |
| Aroma composition H from Example 1 | | | | | | | | | 0.05 | 0.02 |
| Citric acid | 0.15 | 0.15 | 0.15 | 0.15 | 0.15 | 0.15 | 0.15 | 0.15 | 0.15 | 0.15 |
| "Lemon" aroma | 0.1 | 0.1 | 0.1 | 0.1 | 0.1 | 0.1 | 0.1 | 0.1 | 0.1 | 0.1 |
| Sucrose | | | | | | | | | 6 | |
| High fructose corn sirup | | | | | | | | | | 6 |
| Water | \multicolumn{10}{c}{make up to 100%} |

The ingredients are mixed in the order indicated, filled into bottles and carbonated.

Compared with preparations A-C, in preparations D-E the astringency and the bitterness are significantly lower; at a lower dosage of the sweetener in preparations G-H, with a significant reduction in bitterness and astringency the sweetness compared to C was not reduced.

Application Example 4

"Cola" Type Soft Drink

Comparison preparations (A-C)
Preparation according to the invention containing aroma compositions according to the invention (D-J)

| Ingredient | \multicolumn{10}{c}{Preparation (Use as a % by weight)} |
|---|---|---|---|---|---|---|---|---|---|---|
| | A | B | C | D | E | F | G | H | I | J |
| Aroma composition A from Example 1 | 0.05 | | | | | | | | | |
| Aroma composition B from Example 1 | | 0.05 | | | | | | | | |
| Aroma composition C from Example 1 | | | 0.05 | | | | | | | |

-continued

| Ingredient | A | B | C | D | E | F | G | H | I | J |
|---|---|---|---|---|---|---|---|---|---|---|
| Aroma composition D from Example 1 | | | | 0.05 | | | | | | |
| Aroma composition E from Example 1 | | | | | 0.05 | | | | | |
| Aroma composition F from Example 1 | | | | | | 0.05 | | | 0.01 | |
| Aroma composition G from Example 1 | | | | | | | 0.05 | | | |
| Aroma composition H from Example 1 | | | | | | | | 0.05 | | 0.01 |
| Phosphoric acid | 0.07 | 0.07 | 0.07 | 0.07 | 0.07 | 0.07 | 0.07 | 0.07 | 0.07 | 0.07 |
| Citric acid | 0.06 | 0.06 | 0.06 | 0.06 | 0.06 | 0.06 | 0.06 | 0.06 | 0.06 | 0.06 |
| Caramel | 0.14 | 0.14 | 0.14 | 0.14 | 0.14 | 0.14 | 0.14 | 0.14 | 0.14 | 0.14 |
| Caffeine | 0.01 | 0.01 | 0.01 | 0.01 | 0.01 | 0.01 | 0.01 | 0.01 | 0.01 | 0.01 |
| "Cola" type drink emulsion | 0.05 | 0.05 | 0.05 | 0.05 | 0.05 | 0.05 | 0.05 | 0.05 | 0.05 | 0.05 |
| Sucrose | | | | | | | | | 7 | |
| High fructose corn sirup | | | | | | | | | | 7 |
| Water | | | | | make up to 100% | | | | | |

The ingredients are mixed in the order indicated, filled into bottles and carbonated.

Application Example 5

Iced Tea Drink

Comparison preparations (A-C)
Preparation according to the invention, containing aroma compositions according to the invention (D-H)

| Ingredient | A | B | C | D | E | F | G | H |
|---|---|---|---|---|---|---|---|---|
| Aroma composition F from Example 1 | 0.03 | | | 0.03 | | | 0.03 | 0.03 |
| Aroma composition G from Example 1 | | 0.03 | | | 0.03 | | | |
| Aroma composition H from Example 1 | | | 0.03 | | | 0.03 | | |
| Citric acid | 0.15 | 0.12 | 0.15 | 0.12 | 0.15 | 0.12 | 0.15 | 0.12 |
| Ascorbic acid | 0.02 | 0.02 | 0.02 | 0.02 | 0.02 | 0.02 | 0.02 | 0.02 |
| Black tea extract | 0.15 | 0.15 | | | 0.15 | 0.15 | | |
| Green tea extract (min. 50% polyphenols) | | | 0.1 | 0.1 | | | 0.33 | 0.33 |
| Natural "lemon" type aroma | 0.1 | | 0.1 | | 0.1 | | 0.1 | |
| Natural "peach" type aroma | | 0.07 | | 0.07 | | 0.07 | | 0.07 |
| Water | | | | make up to 100% | | | | |

The ingredients are mixed in the order indicated, filled into bottles and carbonated.

Application Example 6

Sugar Reduced Ice Cream

Reference with sugar (A)
Reference with reduced sugar (B)
Preparation according to the invention (C-F)

| Ingredient | A | B | C | D | E | F |
|---|---|---|---|---|---|---|
| Butter 82% fat | 12.50 | 12.50 | 12.50 | 12.50 | 12.50 | 12.50 |
| Sugar (sucrose) | 12.00 | 6.00 | 6.00 | 6.00 | 6.00 | 6.00 |
| Skimmed milk powder | 5.00 | 5.00 | 5.00 | 5.00 | 5.00 | 5.00 |
| Glucose syrup 72% TM | 5.00 | 2.50 | 2.50 | 2.50 | 2.50 | 2.50 |
| Emulsifier SE 30 (Grindstedt Products, Danmark) | 0.65 | 0.65 | 0.65 | 0.65 | 0.65 | 0.65 |
| Vanilla flavor 222292 | 0.20 | 0.20 | 0.20 | 0.20 | 0.20 | 0.20 |
| Sorbitol | — | 2.00 | 2.00 | 2.00 | 2.00 | 2.00 |
| Extract from example 2 | — | — | 0.01 | 0.005 | 0.01 | 0.005 |
| Extract from *Rubus suavissimus*, containing 5% by weight Rubusoside, e.g. from Plant extract | — | — | — | — | — | 0.010 |
| Hesperetin 2.5% in 1,2-propylenglycol | — | — | — | 0.10 | — | 0.10 |
| Phloretin 2.5% in 1,2-propylenglycol | — | — | — | — | 0.05 | 0.05 |
| Skimmed milk | | | Up to 100% | | | |

Skimmed milk and glucose syrup were heated up to 55° C. After melting the butter a blend of the solids and flavour was added. The mixture was heated up to 75° C., and homogenised (50/150 bar). After heating to 89° C. the temperature was hold for 2 minutes and cooled down to 2-4° C. After maturation time of 10 h the ice cream was filled and frozen at −18° C.

Application Example 7

Milk Shakes

Reference with sugar (A)
Reference with reduced sugar (B)
Preparation according to the invention (C-D)

| Ingredient | Preparations content in % by weight | | | |
|---|---|---|---|---|
| | A | B | C | D |
| Sucrose | 6 | 3 | 3 | — |
| Fructose | — | — | 0.5 | — |
| Rebaudioside A 98% | — | — | 0.005 | 0.015 |
| Hesperetin | — | — | 0.002 | — |
| Phloretin | — | — | 0.002 | 0.003 |
| Homoeriodictyol-sodium salt | — | — | — | 0.002 |
| Milk (UHT), 1.5% fat | fill up to 100% | | | |

All ingredients were mixed, filled up with milk, stirred well, filled in bottles and stored cool at 5° C.

Application Example 8

Fat Reduced Yoghurt

Reference with sugar (A)
Preparation according to the invention (B-D)

| Ingredient | Preparations content in % by weight | | | |
|---|---|---|---|---|
| | A | B | C | D |
| Sucrose | 8 | 5.6 | 5.6 | — |
| Rebaudioside A 98% | — | 0.007 | 0.007 | 0.04 |
| Hesperetin | — | 0.001 | 0.001 | 0.001 |
| Phloretin | — | — | 0.002 | 0.003 |
| Homoeriodictyol-sodium salt | — | — | — | 0.005 |
| Yoghurt, 0.1% fat | Filled up to 100% | | | |

All ingredients were mixed well and stored at 5° C.

Application Example 9

Sugar Reduced Soft Drink

Reference with sugar (A)
Reference with reduced sugar (B)
Preparation according to the invention (C-F)

| Ingredient | Preparations (content in % by weight) | | | | | |
|---|---|---|---|---|---|---|
| | A | B | C | D | E | F |
| Sugar syrup (65%) | 154 | 77 | 77 | 77 | 77 | 77 |
| Citric acid (50%) | 3 | 3 | 3 | 3 | 3 | 3 |
| Ascorbic acid | 0.5 | 0.5 | 0.5 | 0.5 | 0.5 | 0.5 |
| Orange emulsion | 1 | 1 | 1 | 1 | 1 | 1 |
| Rebaudioside A (98%) | | 0.15 | 0.15 | 0.15 | 0.15 | 0.15 |
| Homo-eriodictyol sodium salt | | | 0.02 | | 0.02 | 0.02 |
| Phloretin | | | | 0.02 | | 0.03 |
| Hesperetin | | | | 0.02 | 0.02 | 0.01 |
| Carbonated water | Up to 1000 | Up to 1000 | Up to 1000 | Up to 1000 | Up to 1000 | Up to 1000 |

All ingredients were mixed well and filled up with carbonated water.

The invention claimed is:

1. An aroma composition for reducing or suppressing a bitterness (taste) impression in the oral cavity comprising:
   (i) 1 to 1,000 ppm of one or more sweeteners selected from the group consisting of stevioside, rebaudioside A, rebaudioside C, dulcosides, mogrosides, phyllodulcin, glycyrrhetinic acid, and extracts of *Stevia*;
   (ii) 0.5 to 300 ppm of one or more bitterness-masking aroma substances or flavourings selected from the group consisting of eriodictyol, homoeriodictyol, homoeriodictyol sodium salt, homoeriodictyol potassium salt and a mixed salt of homoeriodictyol sodium or potassium salt with homoeriodictyol calcium salt; and
   (iii) 0.1 to 500 ppm of one or more additional aroma substances, wherein at least one of the additional aroma substances is a sweetness intensifying aroma substance selected from the group consisting of hesperitin and phloretin,
   wherein the mixture of components (i), (ii), and (iii) reduces or suppresses the bitterness (taste) impression without reducing sweetness.

2. An aroma composition according to claim 1, wherein the ratio of the components of group (i) to the components of group (ii) is between 1:10 and 1,000:1.

3. An aroma composition according to claim 1, wherein the ratio of the weight of the components of group (iii) to the total weight of the components in groups (i) and (ii) is between 3:1 and 1:1000.

4. An aroma composition according to claim 1, wherein the aroma composition further comprises (iv) one or more inactive substances or carriers, and wherein the ratio of the weight of the components in group (iv) to the total weight of the components of groups (i), (ii) and (iii) is between 100:1 and 1:1.

5. An aroma composition according to claim 1, further comprising at least one component for intensifying a salty and/or umami taste impression.

6. A preparation comprising an aroma composition according to claim 1, wherein the preparation is a foodstuff, a pharmaceutical, a medicinal, an oral hygiene product, or a product consumed for pleasure.

7. An aroma composition for reducing or suppressing an unpleasant (taste) impression in the oral cavity comprising:
   (i) 1 to 1,000 ppm of rebaudioside A;
   (ii) 0.5 to 300 ppm of one or more bitterness-masking aroma substances or flavourings selected from the group consisting of eriodictyol, homoeriodictyol, homoeriodictyol sodium salt, homoeriodictyol potassium salt and a mixed salt of homoeriodictyol sodium or potassium salt with homoeriodictyol calcium salt; and
   (iii) 0.1 to 500 ppm of hesperitin and phloretin.

8. A method of reducing or suppressing the bitter, effect of a sweetener, comprising mixing:
   (i) 1 to 1,000 ppm of one or more sweeteners selected from the group consisting of stevioside, rebaudioside A, rebaudioside C, dulcosides, mogrosides, phyllodulcin, glycyrrhetinic acid, and extracts of *Stevia*;

(ii) 0.5 to 300 ppm of one or more bitterness-masking aroma substances or flavourings selected from the group consisting of eriodictyol, homoeriodictyol, homoeriodictyol sodium salt, homoeriodictyol potassium salt and a mixed salt of homoeriodictyol sodium or potassium salt with homoeriodictyol calcium salt; and (iii) 0.1 to 500 ppm of one or more additional aroma substances, wherein at least one of the additional aroma substances is a sweetness intensifying aroma substance selected from the group consisting of hesperitin, and phloretin.

9. The method according to claim 8, wherein the sweetener is a rebaudioside.

10. The method according to claim 8, wherein the aroma composition contains homoeriodictyol or a physiologically tolerated salt thereof wherein the counteracting cation of the physiologically tolerated salt is selected from the group consisting of $Na^+$, $K^+$, and $Ca^{2+}$.

11. The method according to claim 8, wherein the bitter, effect of a sweetener is reduced or suppressed in a preparation selected from the group consisting of a foodstuff, a pharmaceutical, a medicine, an oral hygiene product, and a preparation consumed for pleasure.

* * * * *